United States Patent

[11] 3,563,519

| [72] | Inventor | Jean-Pierre Lippmann<br>Vaucresson, France |
|---|---|---|
| [21] | Appl. No. | 806,181 |
| [22] | Filed | Mar. 11, 1969 |
| [45] | Patented | Feb. 16, 1971 |
| [73] | Assignee | Societe Des Forges Et Ateliers Du Creusot<br>Paris, France |
| [32] | Priority | Mar. 29, 1968 |
| [33] | | France |
| [31] | | 146,361 |

[54] INSTALLATIONS FOR PREHEATING PULVERULENT SUBSTANCES BY THE WASTE GASES OF A FURNACE FOR TREATING THE SUBSTANCES
1 Claim, 1 Drawing Fig.

[52] U.S. Cl. .................................................... 263/21;
34/57
[51] Int. Cl. ...................................................... F27b 15/00
[50] Field of Search ............................................ 263/32, 21
(A), 21 (B); 34/57, 57 (A)

[56] References Cited
UNITED STATES PATENTS

| 3,119,605 | 1/1964 | Berz ............................. | 263/32X |
| 3,162,431 | 12/1964 | Muller et al. ................. | 263/32 |
| 3,473,794 | 10/1969 | Elkjaer ......................... | 263/32 |

*Primary Examiner*—John J. Camby
*Attorney*—Cameron, Kerkam & Sutton

ABSTRACT: An installation for preheating pulverulent substances by the waste gases of a furnace for treating the substances, in which a fraction of the preheating gases having passed through the preheaters of the installation feeds of a recycling circuit at at least two places of reintroduction into the reheating cycle, the fraction being taken from a fan sucking in the gases passing through the installation flow in one branch being controlled in response to temperature and in the other branch in response to flow in the preheating circuit.

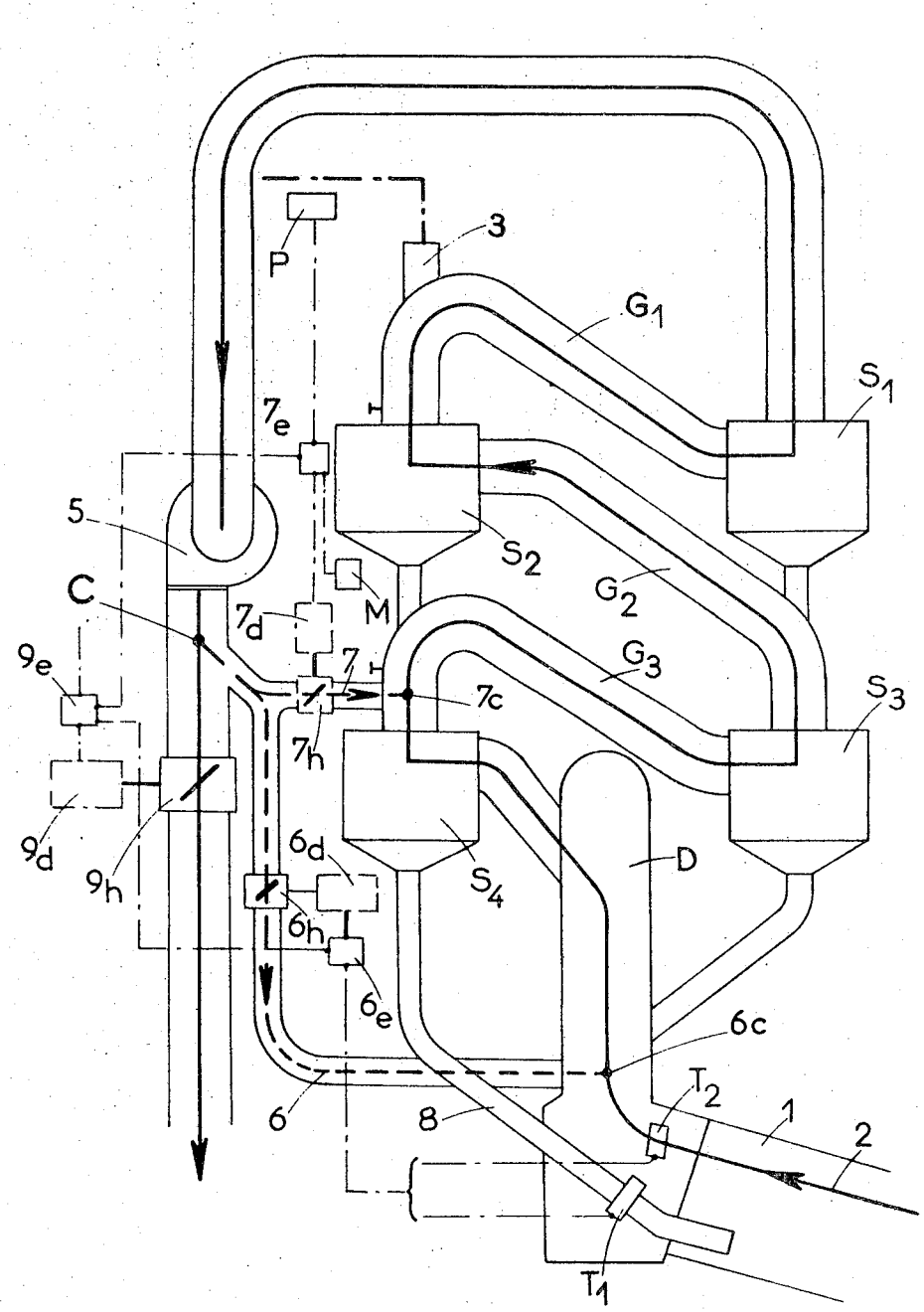

INSTALLATIONS FOR PREHEATING PULVERULENT SUBSTANCES BY THE WASTE GASES OF A FURNACE FOR TREATING THE SUBSTANCES

The invention relates to improvements to installations for preheating pulverulent substances by the waste gases of a furnace for treating the substances.

Preheating installations are known which comprise a plurality of successive temperature exchange zones in which the pulverulent material is suspended in the flow of hot gases, each of the zones being followed by a mixture separator. As a rule these installations are designed to produce an optimum yield for a predetermined flow of pulverulent materials corresponding to a predetermined flow of waste gases at substantially constant temperature.

To enable the range of heat exchanges in the preheating installation to be modified, it has been suggested that a fraction of the preheating gases having passed through the preheater assembly of the installation should be taken and the gases taken should be reintroduced at two places in the reheating cycle, the amounts reintroduced being regulated in relation to the final preheating temperature of the pulverulent material and the flow of pulverulent materials to be treated respectively. The recycling circuit can comprise two separate branches fed by gases taken from the preheating circuit, each of the branches having at least one place of reintroduction into the circuit upstream of the or each last preheater, each of the branches comprising a flow regulating fan controlled by measurements carried out at least one place in the preheating circuit.

It is an object of the invention to simplify the construction of the recycling circuit and therefore the preheating installation as a whole.

According to the invention the fraction of gas which feeds the recycling circuit having two branches on reintroduction into the preheating circuit is taken downstream of a fan sucking in the gases passing through the installation, one of the branches comprising a regulating valve controlled by a temperature measurement, the other branch comprising a regulating valve controlled by a flow measurement of the installation, and a valve whose regulation is controlled by the regulations of the two valves of the recycling circuit is disposed on the escape conduit for the gases downstream of the place where the fraction of gas feeding the recycling circuit is taken.

Organizing the recycling circuit in this way, besides eliminating the fans on the two branches of the circuit, also enables the two flows reintroduced to be adapted continuously to the various working conditions, inter alia to overproduction rates.

A more detailed description of the invention will now be given with reference to the accompanying drawing which shows, by way of example, a prior art preheating installation having the improvements according to the invention.

Waste gases from a furnace 1 follow a circuit 2, the pulverulent material being introduced at a place 3 (to simplify the drawing, it does not show the path followed by the pulverulent material in the installation, which comprises separators S1—S4, preheating sheaths S1—S3 and a preheating dome D). The waste gases are sucked in by a fan 5 disposed downstream of the separator S1.

The recycling circuit comprises two branches 6, 7 each having at least one place of reintroduction, as 6c and 7c in the preheating circuit.

The recycling flow feeding the branches 6, 7 of the recycling circuit is taken at a place C downstream of the fan 5. Disposed on the branch 6 is a valve 6h controlled by a motor 6d controlled by a regulator 6e in relation to temperature measurements carried out either at $T_2$ on the gases leaving the furnace, or at a place $T_1$ on the pulverulent substances at the inlet to the furnace. Similarly, the branch 7 comprises a valve 7h controlled by a motor 7d controlled by a regulator 7e in relation to the pressure of the gases downstream of the place of reintroduction 7c (indicator M) and in relation to the flow of pulverulent materials at the inlet of the installation, measured at P.

Downstream of the place C where the recycling flow is taken, the conduit for evacuating the gases to a dust-removing device, and if necessary to a crusher and a drier (not shown) has a valve 9h controlled by a motor 9d whose regulator 9e receives a signal corresponding to the speed of the motor driving the fan 5, and signals delivered by the regulators 6e, 7e of the motors 6d, 7d.

The fan 5 operates normally at constant flow, corresponding to the nominal preheating flow for the installation.

When the installation is operating with a flow lower than the nominal flow laid down, the regulator 7e opens the valve 7h on the branch 7, to regulate the amount reintroduced at 7e in relation to the pressure measured downstream of the place of reintroduction, the regulating signal being also transmitted to the regulator 9e to close the valve 9h correspondingly downstream of the place C.

For the nominal flow laid down, the valve 7h will be closed, so as to eliminate reintroduction at 7c; if the flow increases above the nominal flow, the speed of the fan 5 is increases, the valve 7h being kept shut.

The amount reintroduced at 6c, regulated by the valve 6h, remains controlled by the regulator 6e, influenced by the detectors of the temperatures $T_1$ and (or) $T_2$, whatever the flow of the installation may be, the signals regulating the amount reintroduced at 6c being also transmitted to the regulator 9e of the valve 9h.

The installation therefore operates with only one fan 5, which is driven at constant speed for flows lower than or equal to the nominal flow of the installation, and at a higher speed for possible overproduction flows.

Of course, the invention is not limited to the embodiment described hereinbefore, which could be modified or added to without exceeding the scope of the invention.

I claim:

1. Improvements in installations for preheating pulverized substances by the waste gases from a furnace treating the substances comprising a ventilator for drawing off the gases from the furnace, an outlet conduit for said ventilator, a plurality of preheaters through which said gases pass and through which the substances circulate in countercurrent with respect to the gases, a preheating circuit connected between the furnace and said ventilator and connecting said preheaters, a separator for the gases and the substances at the outlet of each of said preheaters, and a recycling circuit for a part of the gases which have passed through said preheaters, said circuit comprising a conduit for the removal of said part of said gases opening into said outlet conduit of said ventilator, two branches for said removal conduit for reintroduction of said part of the gases into said preheating circuit, a control valve in one of said branches, means for controlling said valve by the pressure in said preheating circuit, a valve in the other of said branches, means for controlling said last-named valve by the temperature at the outlet of the furnace, said outlet conduit for said ventilator having a valve downstream of said conduit for the fraction of the gases and means for controlling said last-named valve according to the positions of said valves in said two branches of said recycling circuit.